Patented June 28, 1949

2,474,367

UNITED STATES PATENT OFFICE 2,474,367

METHOD OF TREATING HYDROPHILIC COLLOIDS TO AVOID SWELLING DURING WASHING

William D. Ramage, Berkeley, Calif., assignor to United States of America as represented by the Secretary of Agriculture No Drawing. Application April 22, 1947, Serial No. 743,211

12 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This application is a continuation-in-part of my copending patent application Serial No. 703,971, filed Oct. 18, 1946, now abandoned.

This invention relates to a method of treating hydrophilic colloids to avoid swelling during washing thereof and without impairing the subsequent swelling power or capacity of the material. It is directed particularly to a method for washing hydrophilic colloidal substances which are contaminated by the presence of water-soluble electrolytes or other water-soluble impurities and which colloidal substances swell in water in the absence of electrolytes.

Thus this invention is directed to the purification, by washing, of a particular class of hydrophilic colloidal substances, i. e., those colloidal substances the swelling capacity in water of which increases as the concentration of electrolytes is decreased. Some hydrophilic colloidal substances, such as gelatin and high-methoxyl pectins, will swell, even in the presence of electrolytes. Thus colloidal substances of this type can be applied to their ultimate uses, even though they may be contaminated with water-soluble electrolytes. Consequently, although my invention may be applied to colloidal substances of this type, there is no particular advantage in so doing. On the other hand, in the case of hydrophilic colloids, the swelling capacity of which increases as the concentration of electrolytes is decreased, the removal of the electrolyte impurity is very important. The presence of such impurity prevents application of the colloidal substance to uses wherein the maximum swelling is desired. Thus my invention is of particular importance with respect to colloidal substances of the latter type. My invention is also applicable to the removal of sugars and other water-soluble non-electrolyte impurities from colloidal substances of the latter type.

Since the gelling power or "hydration-capacity" of many hydrophilic colloidal substances is greatly diminished by even low concentrations of electrolytes (Reitz et al., Industrial and Engineering Chemistry, vol. 36, pp. 1149–1151 (1944)) it is important that soluble electrolytes be almost completely removed during manufacture of the gelling substance. However, when this purification is carried out by washing with water, the concentration of electrolyte is progressively reduced and this in turn causes more and more swelling of the colloidal substance. Consequently, each washing operation becomes more time consuming and requires very large vessels in the final stages for very small amounts of the product. For example, in washing sodium gluten sulphate (which may be prepared from wheat gluten by the processes described in the Reitz Patent 2,344,267 and in Reitz application Serial No. 611,216, filed Aug. 17, 1945) by ordinary water washing, the final washes are done on a gel containing less than one-half of one percent of solids. Thus the required ratio of water to solids is considerably more than 200 to 1 in order to effect any appreciable removal of electrolytes in the final washings. Separation of the wash water from the gel is also extremely difficult, because gel and water have nearly the same density.

One of the objects of the present invention is to make possible a great reduction in the volume of wash water and the size of washing containers required, by preventing the product from swelling during washing. This is accomplished by washing with a solution containing volatile electrolyte which can be completely volatilized from the colloidal substance during drying or under the influence of vacuum.

Another object of my invention is to effect a reduction in the time required for washing the colloidal substance. This is accomplished by virtue of the relatively dense structure of the colloidal substance when maintained in contact with a high concentration of electrolytes. Relatively little of the wash water is absorbed under these conditions, and the wash water rapidly leaches out the non-volatile impurities from the small particles of the colloidal substance. Furthermore, separation of the wash water from the particles of colloidal substance is easy, rapid, and positive as contrasted to the difficult separation from the swollen gel when washing with water alone.

Another object of my invention is to prevent the swelling of hydrophilic colloids, in general, without impairing their subsequent swelling power.

As an example of the application of the invention, the washing procedure in the manufacture of sodium wheat-gluten sulphate is described below:

Sodium wheat-gluten sulphate ordinarily requires a large number of washes to effect satisfactorily complete removal of the sodium sulphate remaining in the product after neutralization of the excess sulphating acid. During the later washes, the washing is inefficient and time consuming, due to the progressive swelling of the sodium gluten sulphate as the concentration of electrolytes is reduced. The final washes are prohibitively time consuming from the standpoint of commercial production. On the other hand, if a concentration of 5 to 10% of ammonium bicarbonate or other volatile ammonium salt is maintained in the washing solution at all times, the colloidal substance does not swell seriously and the particles thereof are granular, rapid-settling and free-filtering. The washing operation is simple and straightforward and requires no special precautions. It can be done either by decantation or in a filter. When the wash water is substantially free from sulphate ions, the colloidal substance is dewatered and placed directly in a vacuum drier.

In the vacuum drier, the colloidal substance dries readily at moderate temperatures (at about 150° F. and 5 mm. of mercury, absolute). The volatile salt is completely volatilized during the drying operation, yielding a salt-free product of maximum gelling power. Tests have shown that prevention of swelling (in this manner) during washing does not impair the quality of the final product. Products prepared in this manner have shown, in some cases, a greater swelling power than other portions of the same batch of material washed and dried by the usual methods.

It is apparent that, in many applications, the concentration of volatile electrolyte in the washing solution is not critical as long as it is high enough to prevent substantial swelling of the colloidal material. It may even be desirable, in some cases, to maintain the wash water saturated with respect to the volatile electrolyte. In other cases, however, it may be desirable to control the concentration of electrolyte so as to permit a certain amount of swelling in the colloidal material. Further extensions of this idea are obvious.

Some base exchange occurs during washing of the sodium gluten sulfate in ammonium bicarbonate solution. The extent of conversion depends upon the concentration of ammonium bicarbonate and the time consumed in washing. Where base exchange is not desired, washing should be rapid to minimize the effect. If one desires ammonium gluten sulfate, which has properties like those of sodium gluten sulfate, the washing is continued until the metathesis between sodium gluten sulphate and sodium bicarbonate to form ammonium gluten sulphate and sodium bicarbonate is complete. Since the solution of ammonium bicarbonate is present in great excess in the washing operation it washes away the sodium bicarbonate, decreasing its concentration to a negligible level. The rate of metathesis is slow.

Other applications of the invention are apparent to one skilled in the art. In general, many colloidal systems that need to be maintained for a time in a coagulated condition may be so maintained in the presence of a moderate concentration of ammonium bicarbonate, or other volatile salt. When it is desired to repeptize the colloids, the ammonium bicarbonate may be removed by subjecting the system to a vacuum until the concentration of ammonium bicarbonate has been reduced to the necessary low level.

In still another application of my invention, a finely divided hydrophilic colloidal substance may be mixed into a slurry in an ammonium bicarbonate solution and dispersed throughout a porous body or a cut surface of the body. The impregnated mass can then be subjected to vacuum to remove the ammonium bicarbonate. The colloidal substance will then hydrate in situ, yielding a rigid structure not obtainable by conventional procedures. This method may, for example, be useful in the sectioning of plant or animal tissues.

The above examples are meant to be typical applications of the invention and not limiting in their scope. Many other applications of the method of my invention are readily apparent.

When ammonium bicarbonate is used as the volatile electrolyte in washing hydrophilic colloids, substantially complete recovery of the ammonium bicarbonate is possible by simply boiling off the ammonia and carbon dioxide and reabsorbing the evolved gases in water.

Although ammonium bicarbonate is preferred in my process, other volatile electrolytes obvious to persons skilled in the art may be employed. Ammonium carbonate, ammonium carbamate, ammonium acetate, ammonium sulfite, and ammonium bisulfite may be used, the latter being considered less desirable than the former. Less volatile electrolytes require higher temperatures and higher vacuum or both. Since the colloidal substance is sensitive to heat, the operator must determine suitable drying temperature and conditions and then employ an electrolyte of sufficient volatility under such conditions.

The process is capable of wide application to colloidal substances the swelling capacity or swelling rate of which in water increases as the concentration of electrolytes is decreased and which colloidal substances are contaminated by the presence of water-soluble electrolytes or other water-soluble impurities. Thus my process is applicable to such materials as gum karaya, gum tragacanth, alginic acid, salts of alginic acid, low-methoxyl pectinic acids, salts of low-methoxyl pectinic acids, and other materials of such nature which are contaminated by the presence of water-soluble electrolytes or other undesirable water-soluble impurities. Further, my process is applicable to the purification of many proteinous materials such as salts of sulphated prolamines, salts of sulphated wheat gluten, salts of sulphated gluten from corn or other sources, salts of sulphated casein, and other salts of sulphated proteins. Thus my process is applicable to the treatment of any hydrophilic colloidal substance, the swelling rate of which in water increases as the concentration of electrolytes is decreased and which is contaminated by the presence of water-soluble electrolytes or other water-soluble impurities. Obviously the question of whether or not the process is applicable to a particular colloidal substance can be readily determined by application of my teaching. The physical form in which the colloidal substance is subjected to the washing is not critical. Generally, it is best to apply the treatment to the colloidal substance which is in the form of a granular solid material so that maximum rate of separation from the wash liquid will be obtained. However, the treatment can also be applied to colloidal material which is partially solvated to form a gel but which is still sufficiently rigid so that during the washing, particles of said gel will remain as individual particles and not cohere together as a single, soft mass.

While the description of the invention has been confined to aqueous systems, other solvents may be used in some cases. The scope of the invention is limited only by the appended claims.

Having thus described my invention, I claim:

1. A process comprising washing an organic hydrophilic colloidal substance contaminated with water-soluble impurities, the swelling capacity of which colloidal substance increases as the concentration of electrolytes is decreased, with an aqueous solution of a salt of ammonia and a weak, volatile acid, said salt being vaporizable at a temperature below that at which the colloidal substance is degraded, and subsequently drying the washed colloidal substance and removing the salt by vaporization.

2. A process comprising washing an organic hydrophillic colloidal substance contaminated with water-soluble impurities, the swelling capacity of which colloidal substance increases as the concentration of electrolytes is decreased, with an aqueous solution of a salt of ammonia and a weak, volatile acid, said salt being vaporizable at a temperature below that at which the colloidal substance is degraded, said solution having a concentration of about 5% to about 10%, and subsequently drying the washed colloidal substance and removing the salt by vaporization.

3. The process of claim 1, in which the colloidal substance is a salt of a sulphated protein.

4. The process of claim 1, in which the colloidal substance is a salt of sulphated gluten.

5. The process of claim 1, in which the colloidal substance is an alkali metal salt of sulphated gluten.

6. The process of claim 1, in which the colloidal substance is the sodium salt of sulphated gluten.

7. The process of claim 1, in which the colloidal substance is a salt of a sulphated protein and the said salt is a carbonate of ammonia.

8. The process of claim 1, in which the colloidal substance is the sodium salt of sulphated gluten and the said salt is a carbonate of ammonia.

9. A process comprising washing an organic hydrophillic colloidal substance contaminated with water-soluble impurities, the swelling capacity of which colloidal substance increases as the concentration of electrolytes is decreased with an aqueous solution of a salt of ammonia and a weak volatile acid, said salt being vaporizable at a temperature below that at which the colloidal substance is degraded, and subsequently drying the washed colloidal substance and removing the said vaporizable electrolyte by vaporization at a temperature below that which will reduce the subsequent swelling power of the colloidal substance.

10. The process of claim 9, in which the colloidal substance is an alkali metal salt of sulphated gluten and the said salt is a carbonate of ammonia.

11. The process of claim 9 in which the colloidal substance is the sodium salt of sulphated wheat gluten and the said salt is ammonium bicarbonate in a concentration from 5 to 10% in the aqueous washing solution, and in which the drying step is under vacuum, ammonium bicarbonate being removed from the gel during the vacuum drying.

12. The process of claim 11 in which the washing with ammonium bicarbonate is continued until substantially all of the sodium gluten sulphate is converted into ammonium gluten sulphate.

WILLIAM D. RAMAGE.

REFERENCES CITED

The following references are of record in the file of this patent:

UNITED STATES PATENTS

| Number | Name | Date |
| --- | --- | --- |
| 1,457,466 | Smith | June 5, 1923 |
| 2,341,381 | Jelley et al. | Feb. 8, 1944 |
| 2,423,773 | Hart et al. | July 8, 1947 |